United States Patent Office 3,095,483
Patented June 25, 1963

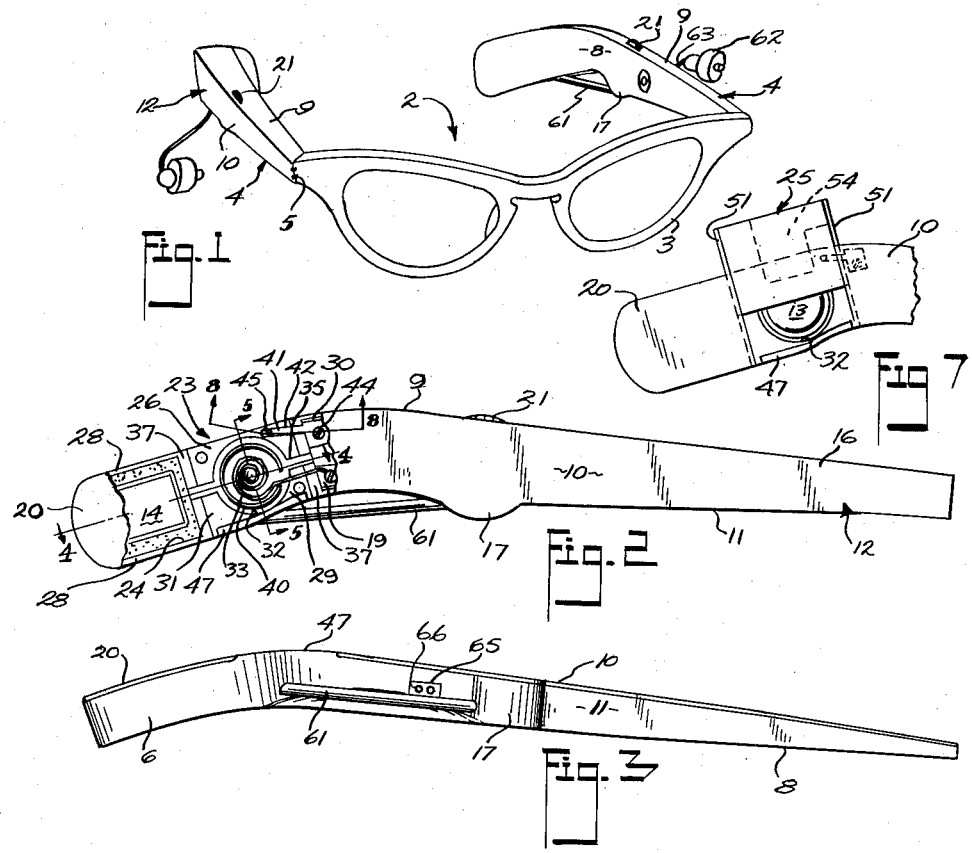
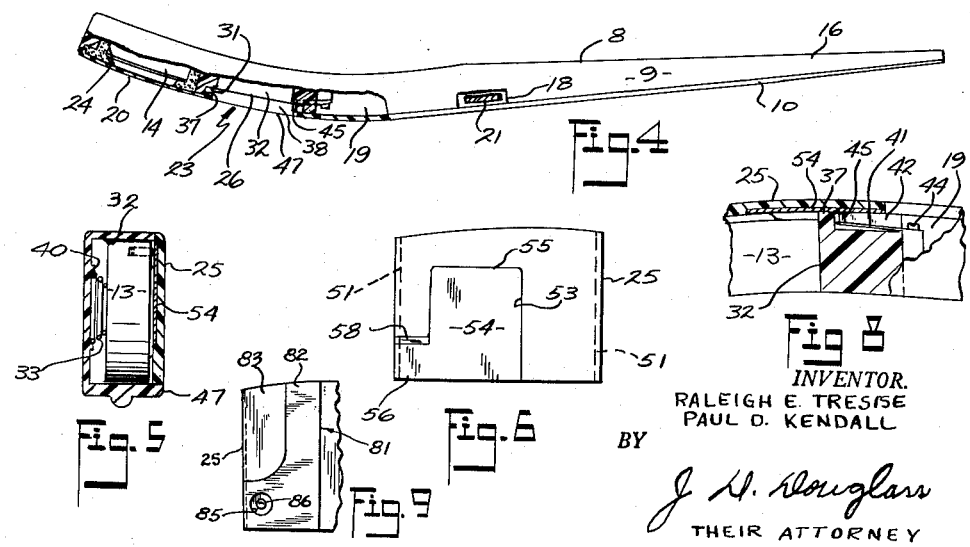

3,095,483
HEARING AID DEVICE
Raleigh E. Tresise, Chagrin Falls, and Paul D. Kendall, Gates Mills, Ohio, assignors to Paravox, Inc., Cleveland, Ohio
Filed Mar. 23, 1956, Ser. No. 573,474
5 Claims. (Cl. 179—107)

This invention relates to hearing aid devices and more particularly to a hearing aid structure that is incorporated within the confines of a spectacle frame used to secure and correctly position eye corrective lenses upon a wearer.

Among the improvements are those which provide for economy of manufacture, a more readily serviceable unit, and one that permits added comfort to the user.

Another important advantage is that the present device eliminates static electrical interferences caused by clothing coming into contact with the hearing aid apparatus.

Still another advantage is that the sound receiving mechanism of the present device is at the ear thereby localizing the pickup thereof to provide a more natural approach to normal hearing.

Another advantage of the present device is that directional hearing is provided whereby the wearer is able to continue using normal habits of hearing without the necessity of creating unnatural and deceptive corrective measures.

Still another advantage is, that an individual hearing aid device, self-contained within one temple member, may be provided for each ear of a defective hearing person, thereby enabling individual and separate correction to be made for each ear, resulting in balanced binaural hearing.

Other advantages will be recognized by those versed in the art, and a more comprehensive understanding thereof will be realized by referring to the accompanying drawings which form a part of the application, and in which;

FIG. 1 is a perspective view of a spectacle hearing aid device embodying the present invention;

FIG. 2 is an elevational plan view of a temple member having the outside wall partially removed to show underlying parts;

FIG. 3 is a bottom view of the temple member of FIG. 2;

FIG. 4 is a top view of the temple member of FIG. 2, with a portion thereof shown in section being taken on lines 4—4 of FIG. 2;

FIG. 5 is a sectional view taken on lines 5—5 of FIG. 2;

FIG. 6 is an elevational view of the underside surface of the movable battery cover;

FIG. 7 is a fragmentary side view of a temple member showing the movable battery cover in one position;

FIG. 8 is a sectional view taken on lines 8—8 of FIG. 2; and,

FIG. 9 is a fragmentary view of another embodiment of the underside surface of the battery cover.

Referring now to the drawings in which like elements are designated by like reference characters, the numeral 2, FIG. 1, denotes a spectacle frame having an eye piece or opthalmic member 3, and two ear extensions or temple members 4. The eye piece 3 may be of any desired configuration depending upon the taste of the wearer; the embodiment illustrated being merely one structure that is adaptable to the present embodiment.

By the present invention, wherein complete and separate hearing aid devices are provided in each temple member 4, resulting in binaural hearing correction, said temple members 4 may be removed and attached to any other eye piece or ophthalmic member 3 that suits the taste of the wearer.

The temple member 4 comprises an elongated irregular-shaped body which, as shown in FIG. 1, is pivotally connected at 5 to the side of the eye piece or ophthalmic member 3.

Intermediate its ends, said member 4, FIGS. 2 and 3, curves arcuately inward and downwardly to an enlarged skull portion 6. The vertical plane of the skull portion may be slightly spaced from the vertical plane of the adjacent portion of said member to accommodate for the natural skull configuration of the normal wearer.

One important feature that is of particular significance is, that the temple member 4, usually constructed of a plastic material, is preformed. That is to say, it is fabricated, usually by a molding process, into the shape as depicted in the drawings, before the internal elements are disposed therein.

The member 4 is substantially rectangular in cross section, having an inner side wall 8, top wall 9, bottom wall 11, and outer side wall 12, comprised of covers 10 and 20, and battery cover 25, FIG. 7, defining therein, suitable compartments for the disposition of hearing aid elements.

Longitudinally of said member 4, the front portion 16 defines a compartment 19, FIGS. 2 and 4, which houses the usual electronic circuitry (not shown) including transistors, capacitors, resistors and inductances and interconnecting wires. Intermediate of said portion 16, a protuberance 17 is formed in the bottom wall 11. A rectangular opening 18 is formed in the top wall 9, opposite to said protuberance 17 and connecting to said compartment 19. A control device 21, is disposed within said compartment 19 and extends through said opening 18, readily available to the wearer. Said device may be a combination on-off-volume control which is well known in the art.

Rearwardly of said compartment 19 a second compartment 23 houses a battery 13, FIG. 5, and juxtaposed thereto in said ear portion 6, FIG. 2, a suitable recess 24 is formed to receive a microphone 14 for receiving audible intelligence.

A suitable ear receiver 62 is provided for disposition within the ear canal, and a short cord 63, connects the receiver to the electronic circuitry within compartment 19 by means of a plug (not shown) connected to the end of the cord and inserted through aperture 65, FIG. 3, formed in the bottom wall 11 and which engages socket means 66 disposed in said compartment 19. The battery 13 and microphone 14 are electrically connected to the electronic circuitry in compartment 19 thereby providing a complete hearing aid unit in each temple member 4.

In the fabrication of said temple member 4, the inner side wall 8 and top and bottom walls 9 and 11 respectively, may be integrally formed by means well known in the art, such as, by a molding process.

The electronic components are then asembled within compartments 19 and 23 and recess 24.

Covers 10 and 20 of the outer side wall 12 are placed over and completely enclose compartment 19 and recess 24, and are rigidly affixed thereto by any suitable means, such as adhesive sealing.

The interior configuration of the battery compartment may be of any desired shape; the construction shown in FIGS. 2 and 5, being adaptable for a particular cylindrical cartridge type battery 13.

As shown in FIGS. 2 and 4, the battery compartment 23 is defined by vertical wall 29, extending from top wall 9 to bottom wall 11 separating said battery compartment 23 from compartment 19, and a second vertical wall 31 similarly disposed between said walls 9 and 11, and separating recess 24 from said battery compartment.

A cylindrical well 32 is formed centrally within said compartment, and a suitable resilient member, such as coil spring 33, is disposed therein. The battery 13 is placed within said well; one end being in electrical and resilient engagement with spring 33. The opposite end of said spring extends through channel 35 and into contact with the electronic circuitry in compartment 19 to provide an electrical return and/or ground path therefor.

A circular ridge 40, may be formed within the well 32 providing a protective channel between the wall of well 32 and said ridge 40 into which wires (not shown) may be disposed, interconnecting the circuitry in recess 24, compartment 19 and battery compartment 23, and preventing said spring 33 from coming into contact with said wires.

In fabricating said temple member 4, the top surface 26 of said battery compartment immediately surrounding said well 32 is formed to be on a slightly lower horizontal plane relative to the top surface 28 of the recess 24 and top surface 30 of compartment 19. By reason of said construction, upstanding ledges 37 are formed adjacent said vertical walls 29 and 31 having a top surface 38 lying in the same plane as said surfaces 28 and 30.

A resilient, metallic, contact arm 41 having one end secured within compartment 19, by screw 44, for connection to associated circuitry in said compartment, is disposed within recess 42 formed in said battery compartment 23, adjacent to said well 32. A contact pin 45 is attached to the opposite free end of said arm 41 and extends upwardly above the plane of surface 26 of said battery compartment.

An elongated abutment wall 47 is formed on the bottom wall 11 of the temple member 4, between and slightly spaced from the vertical walls 29 and 31.

The end of each cover 10 and 20 adjacent the battery compartment 23 extends over the ledges 37; one portion engaging abutment 47, and the remaining portion thereof being in overlying relationship with surface 26 of compartment 23, thereby defining a substantial rectangular opening 38, FIG. 4, to provide access to the battery compartment.

The battery cover 25 is removably disposed within said defined opening 38, completely closing said compartment 23.

Outwardly extending rails 51, FIGS. 6 and 7, formed on the sides of said cover 25 are in dove-tailed relationship with the overlying portions of covers 10 and 20 to releasably lock said cover when placed therebetween.

A recess 53 is formed in the cover 25, opening upon the inner face thereof, and a metallic contact plate 54 is disposed and secured therein.

The contact plate 54 is substantially L-shaped in form, having a large leg 55 for engagement with the battery 13, and a small leg 56 disposed for engagement with contact pin 45, when the cover 25 completely encloses compartment 23. A cam 58 may be formed on the initial contact pin engaging edge of leg 56 to provide a more smooth switching action between said leg 56 and contact 45 of arm 41.

The battery cover 25 is placed into said opening 38 between covers 10 and 20 and is slidable within the confines of the overlying portions of said covers until the bottom edge thereof strikes abutment 47. In this position, the leg 56 of contact plate 54 is in engagement with contact pin 45, and the leg 55 of said plate is in engagement with the battery 13. The electrical energy of the battery 13 is thereby transmited to the associated electronic circuitry of said device.

The pressure exerted by coil spring 33 forces the battery against leg 55 of the plate 54, which in turn presses the rails 51 against the underside surfaces of overlying portions of covers 10 and 20 to releasably secure said cover 25 within said opening 38 of battery compartment 23.

FIG. 9 shows another embodiment of contact plate 81, comprised of a conductive material 82 deposited on the underside surface 83 of the cover 25 by a printing process, being defined as a printed circuit. An opening 85 is formed in the conductive material connecting with a circular recess 86 formed on the cover adapted to receive the contact pin 45 of arm 41. This particular configuration enables the cover 25 to be raised slightly upward within said confining overlying portions of covers 10 and 20, until the pin 45 enters into opening 85 thereafter becoming seated within recess 86 to disconnect the electrical energy of battery 13 from the associated circuitry.

With this particular configuration of cover 25 being utilized, the control member 21 may only need to be a volume control device, since the cover and associated contact pin 45 is directly operable therebetween to turn the hearing aid unit to an off or on position.

In normal use, the temple member 4, pivotally attached to each side of the eye piece or ophthalmic member 3, extends along each side of the skull of the wearer to a position directly over the ear, whereat, it then curves downwardly and inwardly following the normal configuration of the skull.

To prevent the temple members 4 from causing discomfort to the ear or disfiguration thereto, due to its inherent thickness, an elongated rod 61, FIGS. 1–3, is attached to the bottom wall 11, having one end connected to protuberance 17 and the opposite end adjacent to the abutment 47. The longitudinal axis of rod 61 may be substantially the same as, or slightly spaced relative to the longitudinal axis of portion 16 of temple member 4 which relationship acts to correctly position the spectacle frame upon the wearer.

When it is desired to turn off the hearing aid, the battery cover 25 is raised upward within its confining structure until the leg 56 of contact plate 54 is disconnected from contact pin 45 of arm 41, or pin 45 enters recess 86.

In this manner, the hearing aid device in each temple member can be controlled whereby adjustment for each device can be independently made to correct the deficiency of hearing for the associated ear.

If the wearer need only use his spectacles intermittently they may be removed and placed within the pocket or other suitable depository of the wearer, and the hearing aid device may be used in the usual manner by a suitable length of cord and attached ear receiver which may be used in place of the one normally worn.

Having thus described our invention we are aware that extensive departures may be made therefrom without departing from the scope of the appended claims.

We claim:

1. A spectacle hearing aid device comprising an ophthalmic member and a temple member pivotally attached on each side thereof, each temple member comprising a shell-like body defining compartment means, hearing aid circuitry in said compartment means, a battery compartment formed in said body and a battery disposed therein, cover means completely enclosing said compartment means, said body defining an opening at one side of said battery compartment, a cover slidably mounted on said body at said opening to close said battery compartment, resilient means disposed in said battery compartment connected to said circuitry and biasing said battery into engagement with said slidable cover, and switch means connecting said battery to said circuitry comprising a contact member attached to said temple member and connected to said circuitry and a contact attached to the inner side of said slidable cover and engaging said battery and said contact member to connect the battery to said circuitry.

2. A spectacle hearing aid device comprising an ophthalmic member and a temple member pivotally attached on each side thereof, each temple member comprising a shell-like body defining compartment means, hearing aid circuitry in said compartment means, a battery compartment formed in said body and a battery disposed therein, cover means secured to said temple member and completely enclosing said compartment means, said body defining an opening at one side of said battery compartment, a cover slidably mounted on said body at said opening to close said battery compartment, spring means in said battery compartment having one end connected to said hearing aid circuitry, the opposite end of said spring means engaging one terminal of said battery and urging said battery into pressure engagement with said slidable cover, and switch means connecting said battery to said circuitry comprising a resilient arm member attached to said temple member and connected to said circuitry and extending across said opening and a metallic contact means secured to the inner side of said slidable cover and movable therewith to engage the other terminal of said battery and said resilient arm member.

3. In a spectacle hearing aid, a temple member for an eye piece frame, a microphone in said temple member, an ear receiver at said temple member, amplifier components in said temple member, a resilient contact arm in said temple member connected to said amplifier components, said temple member having a battery compartment therein which is open at one side, a battery in said battery compartment, a cover for said compartment movably mounted on said temple member to close said opening and extend across said contact arm, and a contact carried at the inner side of said cover which engages one terminal of the battery and said contact arm when the cover closes said opening to thereby connect the battery to said amplifier components.

4. In a spectacle hearing aid, a temple member for an eye piece frame, a microphone in said temple member, an ear receiver at said temple member, said temple member having ap air of compartments therein separated by a wall, amplifier components in one of said compartments, a battery in the other compartment, said temple member having an opening at one side which extends across the battery compartment and said wall, a coil spring connected to said amplifier components and located in said battery compartment opposite said opening, said coil spring engaging one terminal of the battery and biasing the battery toward said opening, a resilient contact arm connected to said amplifier components and presenting a contact surface at said wall at the opening in the temple member, a cover slidably mounted on the temple member to close said opening, and a contact at the inner side of said cover which engages the opposite terminal of the battery and said contact surface on the contact arm to connect the battery to said amplifier components when the cover is closed.

5. A spectacle hearing aid device comprising an ophthalmic member and temple members connected to opposite sides of said ophthalmic member and extending rearward therefrom, each of said temple members having an ear-engaging portion thereon, each of said temple members having a plurality of compartments therein which are spaced apart lengthwise along the temple member, a microphone in a compartment in each temple member just behind said ear-engaging portion thereon, a battery in another compartment in each temple member just forward from the microphone compartment, an ear receiver at each temple member, amplifier components in another compartment in each temple member forward from the battery compartment and having connections to the microphone, battery and ear receiver at said temple member to provide a self-contained hearing aid unit at said temple member, and a volume control at each temple member connected to the amplifier components therein to control the volume of the sound at the corresponding ear receiver, each of said temple members being formed with an opening at the battery compartment, a resilient contact arm in each temple member connected to the amplifier components in that temple member and presenting a contact surface at said opening which is spaced from the battery in said temple member, a cover slidably mounted on each temple member to close said opening, and a contact at the inner side of each cover which engages the battery and said contact surface on the contact arm to connect said battery to the amplifier components when the cover is closed.

References Cited in the file of this patent

UNITED STATES PATENTS

| | | |
|---|---|---|
| 1,154,069 | Soret | Sept. 21, 1915 |
| 1,833,792 | Pfaus et al. | Nov. 24, 1931 |
| 2,207,705 | Cox | July 16, 1940 |
| 2,613,282 | Scaife | Oct. 7, 1952 |
| 2,765,373 | Smith | Oct. 2, 1956 |
| 2,792,457 | Zapelloni | May 14, 1957 |
| 2,794,085 | De Anglis | May 28, 1957 |

FOREIGN PATENTS

| | | |
|---|---|---|
| 229,074 | Switzerland | Dec. 16, 1943 |
| 526,640 | Belgium | Mar. 15, 1954 |
| 541,226 | Great Britain | Nov. 18, 1941 |
| 737,115 | Great Britain | Sept. 21, 1955 |
| 794,347 | Great Britain | Apr. 30, 1958 |

OTHER REFERENCES

The Optician, vol. XCV, April 29, 1938, page 223.